United States Patent Office 3,703,444
Patented Nov. 21, 1972

---

3,703,444
PRODUCTION OF PURE 2-ETHYL HEXANOL BY THREE-STAGE DISTILLATION
Heinz Graefje, Ludwigshafen, and Erich Flickinger, Frankweiler, Germany, assignors to Badische Anilin- & Soda-Fabrik Aktiengesellschaft, Ludwigshafen (Rhine), Rheinland-Pfalz, Germany
No Drawing. Filed Oct. 7, 1970, Ser. No. 78,975
Claims priority, application Germany, Oct. 17, 1969, P 19 52 333.2
Int. Cl. B01d 3/14; C07c 29/26
U.S. Cl. 203—78                                        6 Claims

ABSTRACT OF THE DISCLOSURE

An improved process for the production of pure 2-ethyl hexanol (obtained by hydrogenation of 2-ethylhexen-2-al-1) by continuous distillation in three columns connected in cascade fashion, the impurities boiling below 2-ethyl hexanol being taken overhead in the first column, pure 2-ethyl hexanol being taken overhead in the second column and the 2-ethyl hexanol still remaining in the higher-boiling impurities being separated in the third column, the improvement comprising the use of a pressure of from 200 to 800 mm. of Hg at the head of the second column and of a pressure of from 70 to 300 mm. of Hg at the head of the third column, sufficient 2-ethyl hexanol being left in the bottoms of the second column to make the concentration thereof at least 50%. 2-ethyl hexanol is used in the manufacture of plasticizers for polyvinyl chloride.

---

The invention relates to an improved process for the production of pure 2-ethyl hexanol from crude 2-ethyl hexanol which has been produced by hydrogenation of 2-ethylhexen-2-al-1, comprising continuous distillation in 3 columns connected in cascade fashion.

2-ethyl hexanol is usually obtained by aldolization of n-butyraldehyde with the elimination of water to form 2-ethyl-hexen-2-al-1 followed by hydrogenation. The 2-ethylhexen-2-al-1 is not purified between the aldolization and hydrogenation stages. Thus the crude 2-ethyl hexanol contains, in addition to the impurities boiling at lower and higher temperatures than 2-ethyl hexanol, an isomeric mixture of unsaturated substances of the formula $$C_{12}H_{22}O$$

2-ethyl hexanol is used in large quantities in the manufacture of plasticizers for polyvinyl chloride. It must therefore satisfy very stringent requirements as regards purity, particularly with respect to discoloration. The industrial method of determining discoloration is to heat a sample with sulfuric acid and then measure the resulting discoloration.

We have found that, apart from other impurities, the isomeric mixture of the formula $C_{12}H_{22}O$ is particularly responsible for discoloration of 2-ethyl hexanol. This compound is particularly difficult to separate, however.

It is the usual practice, in purifying compounds by distillation, to remove the lower-boiling impurities in a first column and then to distil the compound being purified from the higher-boiling constituents in a second column and finally to isolate, in a third column, the desired product still contained in the higher-boiling constituents. When applying this technique to the purification of 2-ethyl hexanol it has previously been the practice to operated industrial plant such that the pressure at the head of the second column is less than 200 mm. of Hg and that in the third column is less than 50 mm. of Hg, in order to obtain optimum results. However, we have found that this method produces 2-ethyl hexanol showing strong discoloration when treated with sulfuric acid (color numbers of from 12 to 95 according to the purity of the crude ethyl hexanol and the efficiency of the distillation). Attempts have already been made to retain the impurities responsible for discoloration of 2-ethyl hexanol in the residue by adding glycol during distillation. One drawback of this method is that it is expensive to use foreign materials for purification purposes, and another disadvantage is that the 2-ethyl hexanol thus obtained still does not satisfy high requirements.

It is an object of the invention to provide a process by means of which all of the impurities which affect the color of 2-ethyl hexanol, in particular the isomeric mixture of the formula $C_{12}H_{22}O$, are removed.

It is another object of the invention to provide a process which produces a 2-ethyl hexanol which shows minimum discoloration when treated with sulfuric acid.

In accordance with the present invention these and other objects and advantages are achieved in an improved process for the production of pure 2-ethyl hexanol from crude 2-ethyl hexanol (obtained by the hydrogenation of 2-ethylhexen-2-al-1) by continuous distillation in 3 columns connected in cascade fashion, the impurities boiling below 2-ethyl hexanol being taken overhead in the first column, pure 2-ethyl hexanol being taken overhead in the second column and the 2-ethyl hexanol still remaining in the higher-boiling impurities being separated in the third column, the improvement comprising the use of a pressure of from 200 to 800 mm. of Hg at the head of the second column and of a pressure of from 70 to 300 mm. of Hg at the head of the third column, sufficient 2-ethyl hexanol being left in the bottoms of the second column to make its concentration therein at least 50%.

The starting material used is usually a crude 2-ethyl hexanol which has been produced by aldolization of n-butyraldehyde followed by hydrogenation of the 2-ethyl-hexen-2-al-1 obtained at pressures ranging from 10 to 320 atmospheres gauge, in particular from 10 to 60 atmospheres gauge. The crude 2-ethyl hexanol suitable for the present process generally contains as impurities from 0.6 to 3%, in particular from 1 to 2% by weight, of portions boiling below 2-ethyl hexanol, such as water, n-butanol, 2-ethylhexen-2-al-1 and 2-ethyl hexanal-1, and also from 1 to 4% by weight of portions boiling above 2-ethyl hexanol, including from 0.01 to 3%, in particular from 0.01 to 0.6% by weight, of isomers of a compound of the formula $C_{12}H_{22}O$.

Distillation is carried out in three columns connected in cascade fashion. Distillation may be carried out using the usual column such as sieve-tray columns or columns with valve trays or bubble-cap trays. Particularly suitable are columns having valve trays or bubble-cap trays. In the first column the portions boiling below 2-ethyl hexanol are taken overhead. The first column advantageously has from 40 to 60 actual trays. The distillation in the first column is conveniently carried out at atmospheric pressure or slightly reduced pressure, for example down to 400 mm. of Hg absolute, the temperature at the head of the column being from 95° to 102° C. and at its base from 165° to 172° C. It is advantageous to maintain a reflux ratio of from 20 to 40:1. The 2-ethyl hexanol obtained as the bottoms from the first column is treated in the second column to remove the high-boiling constituents. The mixture to be distilled is conveniently passed to the lower half of the second column, for example to the 15th tray of a 60 tray column, and pure 2-ethyl hexanol is taken overhead. The second column advantageously has from 40 to 80 actual trays. This column is operated such that the pressure at the head of the column is from 200 to 800 mm. of Hg. Particularly good results are obtained when the pressure is from 300 to 760 mm. of Hg. The temperature at the head and base of the second column depends on the pressures used. It is advantageous to use a reflux ratio of from 1 to 3:1. In the second column the amount of 2-ethyl hexanol which is distilled off is such that the bottoms still contain at least 50%, in particular from 50 to 70% by weight, of 2-ethyl hexanol. The bottoms obtained from the second column are worked up in a third column, which advantageously possesses from 30 to 50 actual trays. The third column is operated such that the pressure at the head of the column is from 70 to 300 mm., in particular from 100 to 250 mm. of Hg. It is advantageous to use a reflux ratio of from 1.5 to 3:1. The pure ethyl hexanol taken overhead in the third column is still slightly impure and is conveniently recycled to the crude 2-ethyl hexanol.

2-ethyl hexanol is used in the manufacture of plasticizers for example by esterifying 2-ethyl hexanol with phthalic anhydride to give di-(2-ethylhexyl)-phthalate, which is the standard industrial plasticizer accounting for 25% of total plasticizer production (Kirk-Othmer, Encyclopedia of Chemical Technology, 2nd edition, vol. 13, p. 723, par. 6).

The efficiency of the process is described below with reference to the following examples in which the parts and percentages are by weight.

EXAMPLE 1

10,000 parts per hour of crude 2-ethyl hexanol (obtained by hydrogenation of crude 2-ethylhexen-2-al-1 at 40 atmospheres gauge) are charged to a first column having 50 valve trays. The crude 2-ethyl hexanol contains 1.5% of portions boiling below 2-ethyl hexanol, including 0.8% of water and 0.1% of 2-ethyl hexanal-1, and it also contains 2.5% of compounds boiling above 2-ethyl hexanol, including 0.2% of the isomers of the compound of the Formula $C_{12}H_{22}O$. The column is operated at atmospheric pressure and the lower-boiling components are distilled off at the top, such that the 2-ethyl hexanol obtained as bottoms has a concentration of 0.02% of water and 0.005% of 2-ethyl hexanal. The resulting bottoms from the first column consist of 9,845 parts per hour, which are passed to the 12th tray of a second column containing 36 trays. The pressure at the head of the second column is 450 mm. Hg. Distillation is carried out at a reflux ratio of 3:1. The overhead consists of 9,295 parts per hour of pure 2-ethyl hexanol, and this shows a color number of from 4 to 6 after treatment with sulfuric acid. 550 parts (containing 54% of 2-ethyl hexanol) are obtained as bottoms, and these are passed to the middle of a column having 45 trays. The pressure at the head of this third column is 200 mm. of Hg and the reflux ratio is 3:1. 297 parts of 2-ethyl hexanol are taken overhead and these are recycled to the crude 2-ethyl hexanol. By recycling the 2-ethyl hexanol from the third column a steady state is reached after a period such that pure 2-ethyl hexanol is obtained which shows a color number of from 5 to 7 after treatment with sulfuric acid.

COMPARATIVE EXAMPLE

Distillation is carried out as described in Example 1 except that the pressure at the head of the second column is 30 mm. of Hg. The 2-ethyl hexanol thus obtained shows a color number of from 100 to 200 after treatment with sulfuric acid.

COMPARATIVE EXAMPLE

Example 1 is repeated except that the pressure at the head of the third column is 20 mm. Hg. The 2-ethyl hexanol obtained by this method shows a color number of more than 40 when treated with sulfuric acid.

EXAMPLE 2

Example 1 is repeated except that the starting material used is a 2-ethyl hexanol obtained by hydrogenation of crude 2-ethyl hexen-2-al-1 at 300 atmospheres gauge and containing 1.4% of portions boiling below 2-ethyl hexanol and 2.8% of portions boiling above 2-ethyl hexanol, including 0.03% of the isomers of the compound of the Formula $C_{12}H_{22}O$. The conditions in the second column are chosen so that the pressure at the head of the column is 500 mm. of Hg and the reflux ratio is 1.2:1. 9,250 parts per hour of distillate are obtained, the bottoms consisting of 600 parts (containing 52% of 2-ethyl hexanol) which are passed on to the third column, where the head pressure is 100 mm. of Hg and the reflux ratio is 1.5:1. The 320 parts of distillate thus obtained are recycled to the crude 2-ethyl hexanol. After a steady state has been established there are obtained 9,570 parts per hour of pure 2-ethyl hexanol from the second column, this showing a color number of from 2 to 3 on treatment with sulfuric acid at elevated temperatures.

COMPARATIVE EXAMPLE

Example 2 is repeated except that the pressure at the head of the second column is 130 mm. of Hg. In this way a 2-ethyl hexanol is obtained which shows a color number of from 8 to 15 when treated with sulfuric acid at elevated temperatures.

EXAMPLE 3

A column having 50 valve trays is charged with 10,000 parts per hour of crude 2-ethyl hexanol (obtained by hydrogenation of crude 2-ethylhexen-2-al-1 at 20 atmospheres gauge) containing 1.8% of portions boiling below 2-ethyl hexanol and 2.6% of portions boiling above 2-ethyl hexanol, including 0.6% of the isomer of the compound of the Formula $C_{12}H_{22}O$. This column is operated at atmospheric pressure at a reflux ratio of 30:1. The bottoms consist of 9,810 parts per hour, and these are passed on to the lower half of a second column containing 80 valve trays. The pressure at the head of the second column is 400 mm. of Hg and the reflux ratio is 1.4:1. The distillate consists of 9,000 parts per hour of pure 2-ethyl hexanol, and the bottoms consist of 810 parts per hour containing 68% of 2-ethyl hexanol. These bottoms are passed to the middle of a third column having 60 valve trays. The pressure at the head of the third column is 250 mm. Hg and the reflux ratio is 3:1. The distillate from the third column consists of 530 parts of hour which are recycled to the crude 2-ethyl hexanol. After the establishment of a steady state there are obtained 9,530 parts of 2-ethyl hexanol per hour from the second column, this showing a color number of less than 10 when treated with sulfuric acid at elevated temperatures.

We claim:

1. In a process for the production of pure 2-ethyl hexanol from crude 2-ethyl hexanol, obtained by the hydrogenation of 2-ethylhexen-2-al-1, by continuous distillation in three columns connected in cascade fashion, the impurities boiling below 2-ethyl hexanol being taken overhead in the first column, pure 2-ethyl hexanol being taken overhead in the second column and the 2-ethyl hexanol still remaining in the higher-boiling impurities being separated overhead in the third column, the improvement which comprises operating the head of the second column at a pressure of from 200 to 800 mm. Hg and operating the head of the third column at a pressure of from 70 to 300 mm. Hg, while retaining sufficient 2-ethyl hexanol in the bottoms of the second column to make its concentration therein at least 50% and recycling the 2-ethyl hexanol separated overhead in the third column to said crude 2-ethyl hexanol being supplied to the first column.

2. A process as claimed in claim 1 wherein crude 2-ethyl hexanol is used which has been produced by aldolization of n-butyraldehyde followed by hydrogenation of the resulting 2-ethylhexen-2-al-1 at pressures ranging from 10 to 320 atmospheres gauge and which contains from 0.6 to 3% by weight of portions boiling below 2-ethyl hexanol and from 1 to 4% by weight of portions boiling above 2-ethyl hexanol, including 0.01 to 3% by weight of the isomers of a compound of the formula $CH_{12}H_{22}O$.

3. A process as claimed in claim 1 wherein the first column has from 40 to 60 actual trays, the temperature at the head of the column being from 95° to 102° C. and at the base of the column from 165° to 172° C., the reflux ratio being from 20 to 40:1.

4. A process as claimed in claim 1 wherein the second column has from 40 to 80 practical trays, the reflux ratio being from 1 to 3:1 and the pressure at the head of the column being from 300 to 760 mm. of Hg.

5. A process as claimed in claim 1 wherein the concentration of 2-ethyl hexanol in the bottoms from the second column is from 50 to 70% by weight.

6. A process as claimed in claim 1 wherein the third column has 30 to 50 actual trays, the pressure at the head of the column being from 70 to 300 mm. of Hg and the reflux ratio being from 1:5 to 3:1.

References Cited

UNITED STATES PATENTS

| | | | |
|---|---|---|---|
| 3,513,078 | 1/1968 | Biarnais et al. | 203—80 |
| 3,121,051 | 2/1964 | Hagemeyer et al. | 203—80 |
| 3,232,998 | 2/1966 | Neal | 260—643 |
| 2,884,363 | 4/1959 | Bloom et al. | 203—80 |
| 3,408,268 | 10/1968 | Pitts et al. | 203—80 |
| 3,188,354 | 6/1965 | Roming, Jr. | 203—80 |

FOREIGN PATENTS 672,635  5/1952  Great Britain.

WILBUR L. BASCOMB, JR., Primary Examiner

U.S. Cl. X.R.

260—643 R

PO-1050
(5/69)

UNITED STATES PATENT OFFICE
CERTIFICATE OF CORRECTION

Patent No. 3,703,444      Dated November 21, 1972

Inventor(s) Heinz Graefje and Erich Flickinger

It is certified that error appears in the above-identified patent and that said Letters Patent are hereby corrected as shown below:

Column 5, line 2, claim 2, "$CH_{12}H_{22}O$" should read -- $C_{12}H_{22}O$ --.

Signed and sealed this 20th day of November 1973.

(SEAL)
Attest:

EDWARD M. FLETCHER, JR.      RENE D. TEGTMEYER
Attesting Officer      Acting Commissioner of Patents